United States Patent
Yu

(10) Patent No.: US 10,897,744 B2
(45) Date of Patent: Jan. 19, 2021

(54) UPLINK SYNCHRONIZATION TIMING DEVIATION DETERMINATION METHOD AND DEVICE

(71) Applicant: DATANG MOBILE COMMUNICATIONS EQUIPMENT CO., LTD, Beijing (CN)

(72) Inventor: Li Yu, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 0 days.

(21) Appl. No.: 16/610,518

(22) PCT Filed: May 2, 2018

(86) PCT No.: PCT/CN2018/085328
§ 371 (c)(1),
(2) Date: Nov. 4, 2019

(87) PCT Pub. No.: WO2018/202038
PCT Pub. Date: Nov. 8, 2018

(65) Prior Publication Data
US 2020/0154387 A1    May 14, 2020

(30) Foreign Application Priority Data
May 4, 2017   (CN) .......................... 2017 1 0309229

(51) Int. Cl.
*H04J 3/00*    (2006.01)
*H04W 56/00*   (2009.01)
*H04L 27/26*   (2006.01)

(52) U.S. Cl.
CPC ..... *H04W 56/0055* (2013.01); *H04L 27/2662* (2013.01); *H04L 27/2675* (2013.01); *H04L 27/2695* (2013.01)

(58) Field of Classification Search
CPC .......... H04W 56/0055; H04W 56/002; H04W 56/0075; H04W 74/0833; H04L 27/2662; H04L 27/2675; H04L 27/2695
See application file for complete search history.

(56) References Cited

U.S. PATENT DOCUMENTS

2003/0227978 A1    12/2003  Magee et al.
2007/0147336 A1*   6/2007   Lee ..................... H04L 27/2656
                                                           370/350
(Continued)

FOREIGN PATENT DOCUMENTS

CN     101997804 A     3/2011
CN     102215184 A     10/2011
(Continued)

OTHER PUBLICATIONS

Huawei et al. "NB-PRACH design", 3GPP TSG RAN WG1 Meeting #84, St. Julian's, Malta, Feb. 15-19, 2016, total 8 pages, R1-161357.

*Primary Examiner* — Abdelnabi O Musa
(74) *Attorney, Agent, or Firm* — Kilpatrick Townsend & Stockton, LLP

(57) ABSTRACT

Disclosed in the present disclosure are an uplink synchronization timing deviation determination method and device, for solving the problem in the prior art that a base station in an NB-IoT system has low accuracy in determining an uplink synchronization timing deviation by performing FFT and IDFT processing on a preamble sequence. The method specifically comprises: a base station receiving a preamble signal transmitted by a terminal device; determining channel estimation values of a frequency domain channel occupied for transmitting each symbol group of the preamble signal; performing, on the basis of a frequency hopping pattern used for transmitting the preamble signal, a conjugate multiplication on the channel estimation values corresponding to (Continued)

each symbol group to obtain a first radian value, and determining, on the basis of the first radian value, an uplink synchronization timing deviation of the terminal device.

10 Claims, 7 Drawing Sheets

(56) References Cited

U.S. PATENT DOCUMENTS

| | | | |
|---|---|---|---|
| 2009/0213943 A1 | 8/2009 | Gu et al. | |
| 2010/0027698 A1* | 2/2010 | Kim | H04L 5/0042 375/260 |
| 2010/0284289 A1* | 11/2010 | Suo | H04W 56/002 370/252 |
| 2015/0172967 A1* | 6/2015 | Senoo | H04W 36/32 455/436 |
| 2015/0263877 A1* | 9/2015 | Chang | H04L 27/2692 370/350 |
| 2017/0094689 A1* | 3/2017 | Lin | H04W 74/0833 |

FOREIGN PATENT DOCUMENTS

| | | |
|---|---|---|
| CN | 102307167 A | 1/2012 |
| CN | 103916348 A | 7/2014 |
| EP | 1826972 A2 | 8/2007 |
| WO | 2017055302 A1 | 4/2017 |

* cited by examiner

US 10,897,744 B2

UPLINK SYNCHRONIZATION TIMING DEVIATION DETERMINATION METHOD AND DEVICE

The present application is a US National Stage of International Application No. PCT/CN2018/085328, filed May 2, 2018, which claims priority to Chinese Patent Application No. 201710309229.7, filed with the Chinese Patent Office on May 4, 2017 and entitled "Uplink Synchronization Timing Deviation Determination Method and Device", which is hereby incorporated by reference in its entirety.

FIELD

The present application relates to the field of communication technologies and particularly to a method and a device of determining uplink synchronization timing deviation.

BACKGROUND

Like the Long Term Evolution (LTE) system, in the Narrow Band Internet of Things (NB-IoT) system, since the distance between the User Equipment (UE) and the base station is uncertain, the UE needs to establish the uplink synchronization with the base station in the random access process. The base station detects the preamble signal transmitted by the UE, estimates the uplink synchronization timing deviation from the received preamble signal and transmits the uplink synchronization timing deviation to the UE in the random access response; and UE calculates the timing advance and adjusts the transmit time of the uplink signal after receiving the random access response to thereby implement the uplink synchronization.

In the LTE system, Preamble sequences are generated by cyclic shifting ZC sequences, and originate from the root sequences of one or more ZC sequences. The method of calculating the uplink synchronization timing deviation used in the LTE system is that the base station processes all preamble signals transmitted by the UE via all the antennas by way of the FFT in which the preamble signals are transformed from the time domain to frequency domain and the subcarrier mapping process. Then the preamble signals after the subcarrier mapping process are transformed into the time domain via the Inverse Discrete Fourier Transform (IDFT) to thereby obtain the cyclic correlation results of the time-domain signals. Then the preamble signals transmitted by the UE via all the antennas and transformed via the IDFT are merged, and finally the peak value of the merged signal is compared with the peak value in the detection window to estimate the uplink Timing Advance (TA) and feeds back it to the UE, so that the UE can adjust the transmit time of the uplink signal based on the TA to implement the uplink synchronization.

In the LTE system, the preamble sequence is constituted of the ZC sequences which have the good autocorrelation and low cross-correlation, so the preamble sequence after the transformations such as FFT and IDFT can present the obvious peak in the detection window so that the TA is estimated according to the peak presented in the detection window with higher accuracy. In the NB-IoT system, the preamble sequence is consisted of four symbol groups, each symbol group including one CP symbol and five OFDM symbols. Since the signals transmitted on the five OFDM symbols in each symbol group are the same, the peak presented in the detection window after the base station performs the transformations such as FFT and IDFT on the preamble sequence is not obvious, so that the accuracy of the uplink synchronization timing deviation determined according to the peak presented in the detection window is low, thus reducing the accuracy of the uplink synchronization.

SUMMARY

The embodiments of the disclosure provide a method and a device of determining the uplink synchronization timing deviation, so as to solve the problem in the prior art that the base station has the lower accuracy in determining the uplink synchronization timing deviation after performing the transform processing such as FFT and IDFT on the preamble sequence in the NB-IoT system.

In a first aspect, an embodiment of the disclosure provides a method of determining the uplink synchronization timing deviation, which includes:

receiving, by a base station, a preamble signal transmitted by a user equipment;

determining, by the base station, a channel estimate value of a frequency-domain channel occupied by each symbol group in the preamble signal;

performing, by the base station, conjugate multiplication on the channel estimate value corresponding to each symbol group based on a frequency hopping pattern used by the preamble signal to obtain a first radian value, and determining the uplink synchronization timing deviation of the user equipment based on the first radian value.

In the embodiment of the disclosure, the base station receives the preamble signal transmitted by the user equipment, then determines the channel estimate value of the frequency-domain channel occupied by each symbol group in the preamble signal, then performs the conjugate multiplication on the channel estimate value corresponding to each symbol group based on the frequency hopping pattern used by the preamble signal to obtain the first radian value, and determines the uplink synchronization timing deviation of the user equipment based on the first radian value. Since the phase difference of the preamble signal is caused by the uplink synchronization timing deviation, the phase difference can reflect the uplink synchronization timing deviation of the user equipment more accurately. Compared with the prior art in which the base station performs the transform processing such as FFT and IDFT on the preamble sequence, in the embodiment of the disclosure, the first radian value is obtained by performing the conjugate multiplication on the channel estimate value corresponding to each symbol group in the preamble signal and the phase difference of the preamble signal is determined according to the first radian value, to increase the accuracy in determining the uplink synchronization timing deviation.

In combination with the first aspect and in a first possible implementation of the first aspect, performing, by the base station, conjugate multiplication on the channel estimate value corresponding to each symbol group based on the frequency hopping pattern used by the preamble signal to obtain the first radian value, includes:

performing, by the base station, conjugate multiplication on channel estimate values of any two symbol groups of which a frequency hopping interval is M subcarriers in the preamble signal to obtain at least two results, and obtaining a sum of the at least two results of the conjugate multiplication to obtain the first radian value, wherein M is a positive integer.

In combination with the first aspect and in a second possible implementation of the first aspect, performing, by the base station, conjugate multiplication on the channel estimate value corresponding to each symbol group based on the frequency hopping pattern used by the preamble signal to obtain the first radian value, includes:

performing, by the base station, conjugate multiplication on channel estimate values of any two symbol groups of which a frequency hopping interval is N subcarriers in the preamble signal to obtain at least two results, and obtaining a sum of the at least two results of the conjugate multiplication to obtain a second radian value, wherein N is a positive integer;

performing, by the base station, conjugate multiplication on channel estimate values of any two symbol groups of which a frequency hopping interval is H subcarriers in the preamble signal to obtain at least two results, and obtaining a sum of the at least two results of the conjugate multiplication to obtain a third radian value, wherein H is a positive integer and N is less than H;

obtaining, by the base station, a sum of the second radian value and the third radian value to obtain the first radian value.

Optionally, the base station can perform the conjugate multiplication on the channel estimate values of any two symbol groups in the preamble signal based on the frequency hopping pattern to obtain at least two results, and obtain a sum of the at least two results of the conjugate multiplication to obtain the first radian value; or the base station can also perform the conjugate multiplication on the channel estimate values of two preselected symbol groups in the preamble signal based on the frequency hopping pattern and take the obtained conjugate multiplication result as the first radian value; the base station can also obtain the first radian value in other ways, which is not limited specifically in the embodiments of the disclosure.

In combination with the second possible implementation of the first aspect, and in a third possible implementation of the first aspect, the uplink synchronization timing deviation meets a formula of:

$$TA = \frac{\theta_{s1} N_{FFT}}{2\pi N} + \frac{\theta_{t1} N_{FFT}}{2\pi H};$$

wherein TA represents the uplink synchronization timing deviation; $\theta_{s1}$ represents an angle value obtained by converting the second radian value; $\theta^{t1}$ represents an angle value obtained by converting the third radian value; and $N_{FFT}$ is the number of points of FFT for the preamble signal.

In combination with the second possible implementation of the first aspect, and in a fourth possible implementation of the first aspect, before the base station determines the uplink synchronization timing deviation of the user equipment based on the first radian value, the method further includes:

performing, by the base station, phase compensation on an angle value obtained by converting the third radian value, wherein the angle value obtained by converting the third radian value after the phase compensation meets a formula of:

$$\theta_{t2} = \text{angle}(R_t e^{-j6\theta_{s2}});$$

wherein $\theta_{t2}$ represents the angle value obtained by converting the third radian value after the phase compensation; $R_t$ represents the third radian value; and $\theta_{s2}$ represents an angle value obtained by converting the second radian value.

In combination with the first aspect, and in a fifth possible implementation of the first aspect, receiving, by the base station, the preamble signal transmitted by a user equipment, includes:

receiving, by the base station, preamble signals transmitted repeatedly by the user equipment;

after performing, by the base station, conjugate multiplication on the channel estimate value corresponding to each symbol group based on the frequency hopping pattern used by the preamble signal to obtain the first radian value, the method further includes:

determining, by the base station, a first average value of the first radian values of the preamble signals transmitted repeatedly, and determining the uplink synchronization timing deviation of the user equipment based on the first average value.

In combination with the first aspect and any one of the first to fifth possible implementation of the first aspect, and in the sixth possible implementation of the first aspect, receiving, by the base station, the preamble signal transmitted by the user equipment, includes:

receiving, by the base station, the preamble signals transmitted by the user equipment via the multi-antenna;

after performing, by the base station, conjugate multiplication on the channel estimate value corresponding to each symbol group based on the frequency hopping pattern used by the preamble signal to obtain the first radian value, the method further includes:

determining, by the base station, a second average value of the first radian values of the preamble signals transmitted via the multi-antenna, and determining the uplink synchronization timing deviation of the user equipment based on the second average value.

In a second aspect, an embodiment of the disclosure provides a device of determining the uplink synchronization timing deviation, which includes:

a receiving module configured to receive a preamble signal transmitted by a user equipment;

a determining module configured to determine a channel estimate value of a frequency-domain channel occupied by each symbol group in the preamble signal received by the receiving module, perform conjugate multiplication on the channel estimate value corresponding to each symbol group based on a frequency hopping pattern used by the preamble signal to obtain a first radian value, and determine the uplink synchronization timing deviation of the user equipment based on the first radian value.

In combination with the second aspect and in a first possible implementation of the second aspect, when performing conjugate multiplication on the channel estimate value corresponding to each symbol group based on the frequency hopping pattern used by the preamble signal to obtain the first radian value, the determining module is configured to:

perform conjugate multiplication on channel estimate values of any two symbol groups of which a frequency hopping interval is M subcarriers in the preamble signal to obtain at least two results, and obtain a sum of the at least two results of the conjugate multiplication to obtain the first radian value, wherein M is a positive integer.

In combination with the second aspect, and in a second possible implementation of the second aspect, when performing conjugate multiplication on the channel estimate value corresponding to each symbol group based on the frequency hopping pattern used by the preamble signal to obtain the first radian value, the determining module is configured to:

perform conjugate multiplication on channel estimate values of any two symbol groups of which a frequency hopping interval is N subcarriers in the preamble signal to obtain at least two results, and obtain a sum of the at least two results of the conjugate multiplication as a second radian value, wherein N is a positive integer;

perform conjugate multiplication on channel estimate values of any two symbol groups of which a frequency hopping interval is H subcarriers in the preamble signal to obtain at least two results, and obtain a sum of the at least two results of the conjugate multiplication as a third radian value, wherein H is a positive integer and N is less than H;

obtain a sum of the second radian value and the third radian value as the first radian value.

In combination with the second possible implementation of the second aspect, and in a third possible implementation of the second aspect, the uplink synchronization timing deviation meets a formula of:

$$TA = \frac{\theta_{s1} N_{FFT}}{2\pi N} + \frac{\theta_{t1} N_{FFT}}{2\pi H};$$

wherein TA represents the uplink synchronization timing deviation; $\theta_{s1}$ represents an angle value obtained by converting the second radian value; $\theta_{t1}$ represents an angle value obtained by converting the third radian value; and $N_{FFT}$ is the number of points of FFT for the preamble signal.

In combination with the second possible implementation of the second aspect, and in a fourth possible implementation of the second aspect, the device further includes:

a phase compensation module configured to perform phase compensation on an angle value obtained by converting the third radian value determined by the determining module before the determining module determines the uplink synchronization timing deviation of the user equipment based on the first radian value, wherein the angle value obtained by converting the third radian value after the phase compensation meets a formula of:

$$\theta_{t2} = \text{angle}(R_t e^{-j6\theta_{s2}});$$

wherein $\theta_{t2}$ represents the angle value obtained by converting the third radian value after the phase compensation; $R_t$ represents the third radian value; and $\theta_{s2}$ represents an angle value obtained by converting the second radian value.

In combination with the second aspect and in a fifth possible implementation of the second aspect, the receiving module is configured to:

receive preamble signals transmitted repeatedly by the user equipment;

the determining module is further configured to:

determine a first average value of the first radian values of the preamble signals transmitted repeatedly, and determine the uplink synchronization timing deviation of the user equipment based on the first average value after performing conjugate multiplication on the channel estimate value corresponding to each symbol group based on the frequency hopping pattern used by the preamble signal to obtain the first radian value.

In combination with the second aspect and any one of the first to fifth possible implementation of the second aspect, and in the sixth possible implementation of the second aspect, the receiving module is configured to:

receive the preamble signals transmitted by the user equipment via the multi-antenna;

the determining module is further configured to:

determine a second average value of the first radian values of the preamble signals transmitted via the multi-antenna, and determine the uplink synchronization timing deviation of the user equipment based on the second average value after performing conjugate multiplication on the channel estimate value corresponding to each symbol group based on the frequency hopping pattern used by the preamble signal to obtain the first radian value.

In the embodiments of the disclosure, the base station receives the preamble signal transmitted by the user equipment, then determines the channel estimate value of the frequency-domain channel occupied by each symbol group in the preamble signal, then performs the conjugate multiplication on the channel estimate value corresponding to each symbol group based on the frequency hopping pattern used by the preamble signal to obtain the first radian value, and determines the uplink synchronization timing deviation of the user equipment based on the first radian value. Since the phase difference of the preamble signal is caused by the uplink synchronization timing deviation, the phase difference can reflect the uplink synchronization timing deviation of the user equipment. Compared with the prior art in which the base station performs the transform processing such as FFT and IDFT on the preamble sequence, in the embodiment of the disclosure, the first radian value is obtained by performing the conjugate multiplication on the channel estimate value corresponding to each symbol group in the preamble signal and the phase difference of the preamble signal is determined according to the first radian value, to increase the accuracy in determining the uplink synchronization timing deviation.

DETAILED DESCRIPTION

In order to make the objects, technical solutions and advantages of the disclosure clearer, the disclosure will be further illustrated below in details with reference to the drawings. Obviously the described embodiments are a part of the embodiments of the disclosure but not all the embodiments. Based upon the embodiments of the disclosure, all of other embodiments obtained by those ordinary skilled in the art without inventive effort pertain to the scope of the disclosure.

Figure 1:
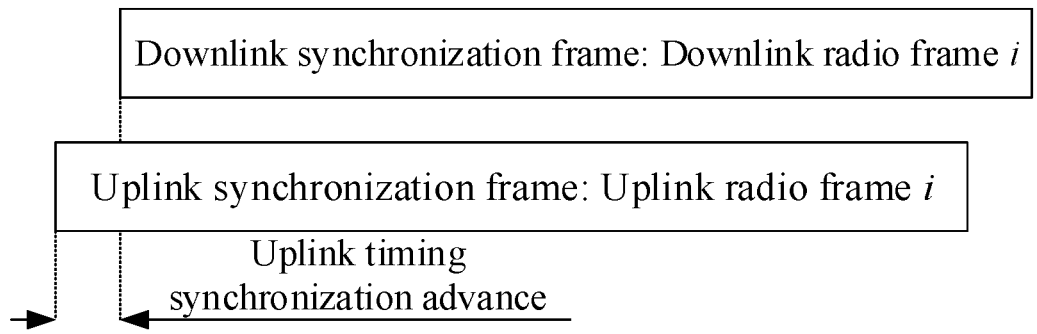
FIG. 1 is a schematic diagram of the uplink synchronization of a user equipment in accordance with an embodiment of the disclosure.

Like the Long Term Evolution (LTE) system, in the Narrow Band Internet of Things (NB-IoT) system, since the distance between the User Equipment (UE) and the base station is uncertain, the UE needs to establish the uplink synchronization with the base station in the random access process; the base station detects the preamble signal transmitted by the UE, estimates the uplink synchronization timing deviation from the received preamble signal and transmits the uplink synchronization timing deviation to the UE in the random access response; and UE calculates the timing advance and adjusts the transmit time of the uplink signal after receiving the random access response to thereby implement the uplink synchronization, as shown in FIG. 1.

In the LTE system, the preamble sequence is generated by cyclic shifting ZC sequence, and they originate from one ZC root sequence. After receiving a preamble signal transmitted by the UE, the base station determines the uplink synchronization timing deviation by the following processes.

First step: the base station removes the CyclicPrefix (CP) portion of the preamble signal according to the preamble format type of the received preamble signal, and reserves the preamble sequence portion.

Second step: the base station performs the spectrum shifting, Cascade Integrator Comb (CIC) downsampling, Fast Fourier Transformation (FFT) and other operations on the preamble sequence to transform the preamble sequence from the time domain to frequency domain, and performs the subcarrier demapping on the preamble sequence transformed to the frequency domain.

Third step: the base station performs the frequency-domain Automatic Gain Control (AGC) processing on the preamble sequence after the subcarrier demapping, to ensure that the amplitude of the preamble sequence after the subcarrier demapping remains in the preset interval.

Fourth step: the base station performs the frequency-domain multiplication on the ZC root sequence and the preamble sequence after the frequency-domain AGC processing.

Fifth step: the base station performs the Inverse Discrete Fourier Transform (IDFT) on the preamble sequence after the frequency-domain multiplication to transform the correlation result of the preamble sequence from the frequency domain to the time domain, thereby obtaining the cyclic correlation result of the time-domain signal.

Sixth step: the base station performs the AGC recovery processing on the preamble signal transformed to the time domain, to recover the amplitude of the preamble sequence transformed to the time domain to the original amplitude when reaching the base station.

Seventh step: the base station merges the signal powers of the preamble signals transmitted by the UE via all the antennas, i.e., merges the preamble sequences recovered to the original amplitudes transmitted by the UE via all the antennas.

Eighth step: the base station estimates the signal power and noise power of the Physical Random Access Channel (PRACH), judges whether a preamble signal accesses from the merged signal power and the signal power and noise power of the PRACH, and estimates the uplink timing advance according to the position of the largest or first diameter in the detection window when the preamble signal accesses. Here the largest diameter represents the largest peak of the amplitude of the merged signal power, and the first diameter represents the first peak of the merged signal power larger than the preset threshold.

In the NB-IoT system, the base station configures one or more Narrowband Physical Random Access Channels (NPRACHs), where each NPRACH is constituted of 12 subcarriers, and each preamble signal transmitted by the UE is transmitted through frequency hopping in 12 subcarriers of one NPRACH. The preamble signal is consisted of four symbol groups, each including one CP symbol and five OFDM symbols. The signals transmitted on the five OFDM symbols are the same and can be 1, so it can be ensured that different preamble signals are orthogonal when a plurality of PRACHs are configured in the frequency domain. The formats and symbol lengths of the preamble signals are as shown in FIG. 1, wherein $Ts=1/1.92/10^6$, the CP lengths of the preamble signals in two formats are different, the format0 supports the cell radius of 10 km, and the format1 supports the cell radius of 40 km.

TABLE 1

| Preamble format | Tcp | Tseq | Total |
| --- | --- | --- | --- |
| 0 | 128Ts | 5*512Ts | $1.4*10^-3$ s |
| 1 | 512Ts | 5*512Ts | $1.6*10^-3$ s |

Wherein Tcp represents the length of the CP in the preamble signal; Tseq represents the length of the preamble sequence in the preamble signal; and Total represents the total length of the preamble signal.

Figure 2:
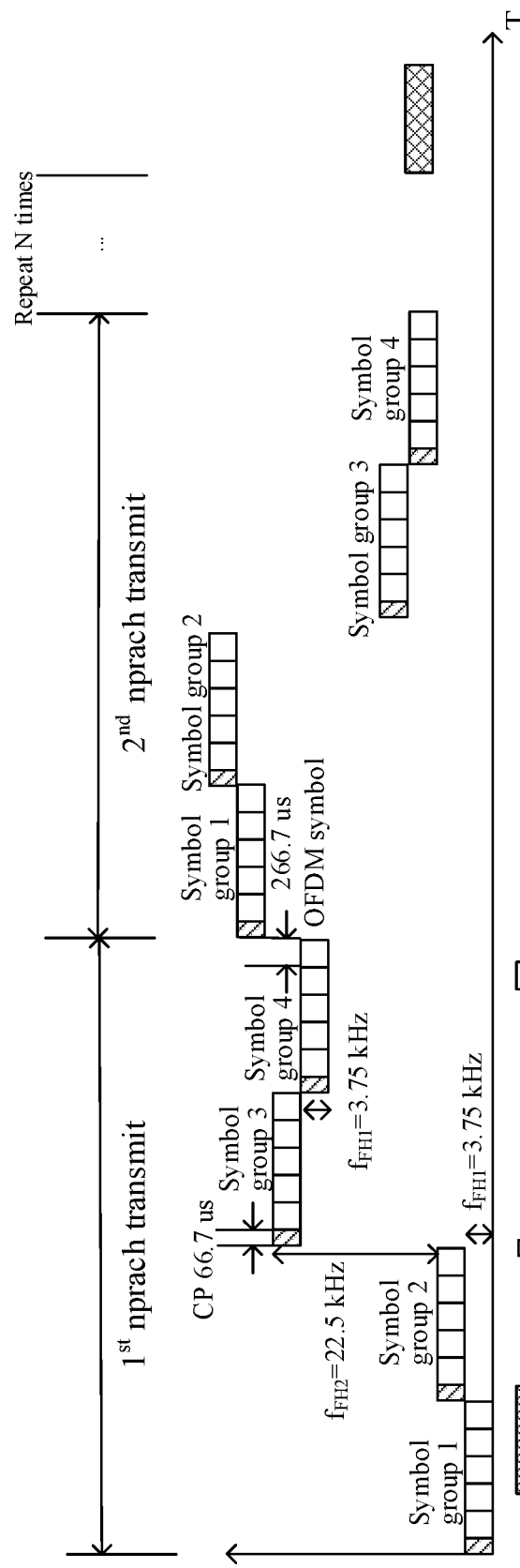
FIG. 2 is a schematic diagram of the frequency hopping pattern in accordance with an embodiment of the disclosure.

Only one subcarrier is occupied when transmitting each symbol group, and it is transmitted in accordance with the preset frequency hopping pattern. The frequency hopping pattern as shown in FIG. 2 is taken as an example to illustrate. Two levels of frequency hopping intervals are configured between the symbol groups in the frequency hopping pattern, where the first level of frequency hopping interval is configured between the symbol group 1 and symbol group 2 as well as between the symbol group 3 and the symbol group 4, and the first level of frequency hopping interval is one subcarrier, FH1=3.75 kHz, which is called the small hopping of the symbol groups; the second level of frequency hopping interval is configured between the second and third symbol groups, and the second level of frequency hopping interval is six subcarriers, FH2=22.5 kHz, which is called the large hopping of the symbol groups. Also the frequency hopping direction of the symbol group 1 and the symbol group 2 is opposite to the frequency hopping direction of the third and fourth symbol groups, and the frequency hopping direction of the symbol group 1 and the symbol group 4 is same as the frequency hopping direction of the symbol group 2 and the symbol group 3.

The preamble signal is transmitted over a long time period and can be transmitted repeatedly multiple times. The number of times the preamble signal can be transmitted repeatedly defined by the 3GPP standard is [1, 2, 4, 8, 16, 32, 64, 128], and the base station can select and configure three numbers of times of repeated transmitting therein. The preamble signal transmitted repeatedly every time is continuous in time and transmitted through frequency hopping in the frequency domain. The frequency hopping manner can be the type2 frequency hopping manner of the LTE Physical Uplink Shared Channel (PUSCH). There is a need to add the Guard Period (GP) of 40 ms after the preamble signal is transmitted repeatedly 64 times. The preamble signal selects different starting subcarriers through the frequency hopping manner at different times, to obtain the anti-interference and frequency-domain diversity merge gain. The different starting subcarriers correspond to different frequency hopping paths, and one subcarrier can carry only one preamble signal of the user at a time.

Since the preamble signal is the ZC sequence in the LTE system and all the ZC sequences have the good autocorrelation and good cross-noncorrelation, the base station can distinguish the multipath after the preamble signal undergoes the transformations such as FFT and IDFT in the LTE system, and thus can merge the signal powers of the preamble signals transmitted by the UE via all the antennas and then determine the uplink synchronization timing deviation according to the merged signal power. But in the NB-IoT system, the preamble sequence is consisted of four symbol groups. Each symbol group includes one CP symbol and five OFDM symbols, and the signals transmitted on the five OFDM symbols are the same, so the base station cannot distinguish the multipath after the preamble signal undergoes the transformations such as FFT and IDFT in the NB-IoT system and cannot merge the signal powers of the preamble signals transmitted by the UE via all the antennas, so that the accuracy in determining the uplink synchronization timing deviation is low. The multipath refers to the propagation phenomenon where the preamble signals transmitted by the user equipment reach the base station via the multi-antenna.

Also the duration time of the preamble signal is relatively long in the NB-IoT system, that is, the transmit time of one symbol group is relatively long, and the interval time between two adjacent symbol groups is relatively long so that the fine synchronization cannot be achieved when the user equipment performs the downlink synchronization, so the user equipment may have the larger residual frequency offset after the downlink synchronization, and the residual frequency offset may cause the additional phase difference, to thereby affect the accuracy in determining the uplink synchronization timing deviation. For example, one symbol group lasts 1.6 ms, and 50 Hz residual frequency offset may cause $0.16\pi$ (phase difference. However the way of determining the uplink synchronization timing deviation by performing the transform processing such as FFT and IDFT on the preamble signal cannot process such residual frequency offset, to thereby cause the lower accuracy in determining the uplink synchronization timing deviation.

Based on this, the embodiments of the disclosure provide a method and a device of determining the uplink synchronization timing deviation, so as to solve the problem in the prior art that the base station has the lower accuracy in determining the uplink synchronization timing deviation after performing the transform processing such as FFT and IDFT on the preamble sequence in the NB-IoT system. The method and the device are based on the same inventive concept. Since the principle of solving the problem in the method is similar to that in the device, the implementations of the method and the device can refer to each other, and the repeated description thereof will be omitted.

In the description of the embodiments of the disclosure, the word such as "first" or "second" is only for purpose of distinguishing the description, and cannot be construed to indicate or imply the relative importance and cannot be construed to indicate or imply the order either.

The embodiments of the disclosure will be illustrated below in details in combination with the drawings.

Figure 3:
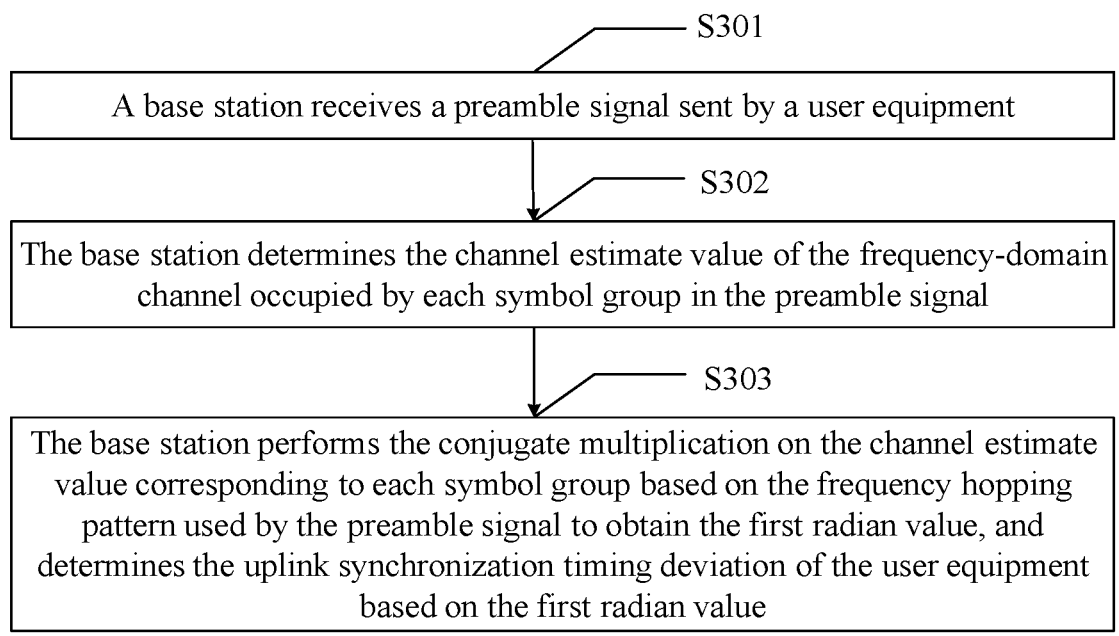
FIG. 3 is a flow chart of a method of determining uplink synchronization timing deviation in accordance with an embodiment of the disclosure.

As shown in FIG. 3, which is a flow chart of a method of determining the uplink synchronization timing deviation provided by an embodiment of the disclosure, the method can specifically include the following steps.

S301: a base station receives a preamble signal transmitted by a user equipment.

S302: the base station determines the channel estimate value of the frequency-domain channel occupied by each symbol group in the preamble signal.

S303: the base station performs the conjugate multiplication on the channel estimate value corresponding to each symbol group based on the frequency hopping pattern used for transmitting the preamble signal to obtain the first radian value, and determines the uplink synchronization timing deviation of the user equipment based on the first radian value.

In the embodiment of the disclosure, the base station receives the preamble signal transmitted by the user equipment, then determines the channel estimate value of the frequency-domain channel occupied by transmitting each symbol group in the preamble signal, then performs the conjugate multiplication on the channel estimate value corresponding to each symbol group based on the frequency hopping pattern used for transmitting the preamble signal to obtain the first radian value, and determines the uplink synchronization timing deviation of the user equipment based on the first radian value. Since the phase difference of the preamble signal is caused by the uplink synchronization timing deviation, the phase difference can reflect the uplink synchronization timing deviation of the user equipment. Compared with the prior art in which the base station performs the transform processing such as FFT and IDFT on the preamble sequence, in the embodiment of the disclosure, the first radian value is obtained by performing the conjugate multiplication on the channel estimate value corresponding to each symbol group in the preamble signal and the phase difference of the preamble signal is determined according to the first radian value, to increase the accuracy in determining the uplink synchronization timing deviation.

Specifically, the base station performs the conjugate multiplication on the channel estimate value corresponding to each symbol group based on the frequency hopping pattern used by the preamble signal to obtain the first radian value, which can be implemented in either of two following ways.

First way: the base station performs the conjugate multiplication on the channel estimate values of any two symbol groups, of which the frequency hopping interval is M subcarriers, in the preamble signal to obtain at least two results, and obtain a sum of the at least two conjugate multiplication results as the first radian value, wherein M is a positive integer.

Second way: A1. the base station performs the conjugate multiplication on the channel estimate values of any two symbol groups, of which the frequency hopping interval is N subcarriers, in the preamble signal to obtain at least two results, and obtains a sum of the at least two conjugate multiplication results as the second radian value, wherein N is a positive integer.

A2. the base station performs the conjugate multiplication on the channel estimate values of any two symbol groups, of which the frequency hopping interval is H subcarriers, in the preamble signal to obtain at least two results, and obtains a sum of the at least two conjugate multiplication results as the third radian value, wherein H is a positive integer and N is less than H.

A3. the base station obtains the sum of the second and third radian values as the first radian value.

Optionally, the base station can perform the conjugate multiplication on the channel estimate values of any two symbol groups in the preamble signal based on the frequency hopping pattern to obtain at least two results, and obtain a sum of the at least two obtained conjugate multiplication results to as the first radian value; or the base station can also perform the conjugate multiplication on the channel estimate values of two preselected symbol groups in the preamble signal based on the frequency hopping pattern and take the obtained conjugate multiplication result as the first radian value; the base station can also obtain the first radian value in other ways, which is not limited herein.

In order for the better understanding of the embodiments of the disclosure, the specific application scenarios are provided, where the specific process of determining the uplink synchronization timing deviation after the base station receives the preamble signal transmitted by the user equipment will be described in details in the case that the frequency hopping pattern used by the preamble signal is the frequency hopping pattern as shown in FIG. 2, and the preamble signal includes symbol group 1, symbol group 2, symbol group 3 and symbol group 4.

First scenario: the base station performs the conjugate multiplication on the channel estimate value corresponding to each symbol group based on the frequency hopping pattern as shown in FIG. 2 to obtain the first radian value, which is implemented in the first way, and M is equal to 1.

Figure 4:
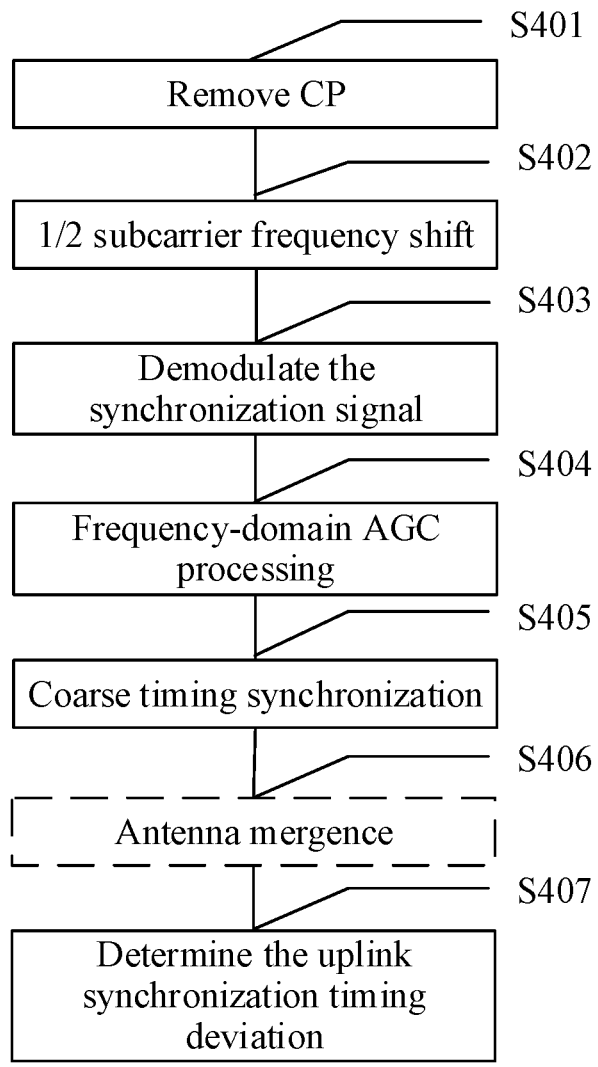
FIG. 4 is a flow chart of a method of determining uplink synchronization timing deviation in accordance with an embodiment of the disclosure.

As shown in FIG. 4, the process in which the base station determines the uplink synchronization timing deviation specifically includes the following steps.

S401: remove CP.

Specifically, the base station removes the CP portion of the preamble signal according to the preamble format type of the received preamble signal.

S402: ½ subcarrier frequency shift.

Specifically, the base station performs the ½ subcarrier (i.e., 1.875 kHz) frequency shift on the preamble signal of which the CP portion is removed.

The base station avoids the effect of the direct current component by performing the ½ subcarrier frequency shift on the preamble signal of which the CP portion is removed.

S403: demodulate the synchronization signal.

Specifically, the base station performs the FFT on the preamble signal after the ½ subcarrier frequency shift to obtain the frequency-domain sequence, determines the centre frequency of the channel in which each OFDM symbol is located according to the frequency hopping pattern as shown in FIG. 2, and extracts the frequency-domain data corresponding to the center frequency of the channel in which each OFDM symbol is located from the frequency-domain sequence of the preamble signal.

S404: frequency-domain AGC processing.

Specifically, the base station performs the frequency-domain AGC processing on the frequency-domain data corresponding to each OFDM symbol, to ensure the amplitude of the frequency-domain data corresponding to each OFDM symbol remains in the preset interval.

S405: coarse timing synchronization.

Specifically, the base station determines the average value of the frequency-domain data corresponding to five OFDM symbols undergoing the frequency-domain AGC processing in each symbol group as the channel estimate value of the frequency-domain channel occupied by each symbol group, performs the conjugate multiplication on the channel estimate values of the symbol group 1 and the symbol group 2 of which the frequency hopping interval is one subcarrier in the preamble signal, performs the conjugate multiplication on the channel estimate values of the symbol group 3 and the symbol group 4 of which the frequency hopping interval is one subcarrier, and obtains a sum of two conjugate multiplication results as the first radian value, wherein the first radian value meets the formula of:

$$R_s = y_1^* y_2 + y_3 y_4^*.$$

$R_s$ represents the first radian value, $y_1$ represents the channel estimate value of the symbol group 1, $y_2$ represents the channel estimate value of the symbol group 2, $y_3$ represents the channel estimate value of the symbol group 3, and $y_4$ represents the channel estimate value of the symbol group 4.

In a possible implementation, when receiving several preamble signals transmitted repeatedly by the user equipment, the coarse timing synchronization process performed by the base station can be implemented in the following ways.

B1. For each preamble signal, the base station determines the first radian value corresponding to each preamble signal.

When the user equipment transmits the preamble signals repeatedly based on different frequency hopping patterns, each preamble signal may frequency hops from the symbol group 1 to the symbol group 2 by the positive hopping (that is, the center frequency of the frequency-domain channel occupied by the symbol group 2 is greater than that occupied by the symbol group 1) or by the negative hopping (that is, the center frequency of the frequency-domain channel occupied by the symbol group 2 is less than that occupied by the symbol group 1). In order to ensure the phase consistency, the first radian values of several preamble signals are corrected in the embodiment of the disclosure.

Specifically, for several preamble signals, the base station can correct the first radian value of the preamble signal which frequency hops from the symbol group 1 to the symbol group 2 by the positive hopping, where the corrected first radian value meets the formula of:

$$R_s = (y_1^* y_2 + y_3 y_4^*)^*.$$

Or, for several preamble signals, the base station can also correct the first radian value of the preamble signal which frequency hops from the symbol group 1 to the symbol group 2 by the negative hopping, which is not limited herein.

B2. The base station determines the radian average value of the first radian values of the several preamble signals, where the radian average value meets the formula of:

$$\overline{R_s} = \frac{1}{N_{rep}} \sum_{i=1}^{N_{rep}} R_s^{(i)};$$

wherein $\overline{R_s}$ represents the radian average value, $N_{rep}$ represents the number of repeated transmitting by the user equipment, and $R_s^{(i)}$ represents the first radian value of the $i^{th}$ preamble signal transmitted.

B3. The base station converts the radian average value into the first angle value which meets the formula of:

$$\theta_s = \text{angle}(\overline{R_s});$$

wherein $\theta_s$ represents the first angle value.

Optionally, the step S406 is performed after S405 and before S407.

S406: antenna mergence.

Specifically, when receiving several preamble signals transmitted by the user equipment via multi-antenna, the base station determines, for each preamble signal, the first angle value corresponding to each preamble signal, and then determines the first angle average value of the first angle values of the several preamble signals, where the first angle average value meets the formula of:

$$\overline{\theta_s} = \frac{1}{N_{aR}} \sum_{j=1}^{N_{aR}} \theta_s^{(j)};$$

wherein $\overline{\theta_s}$ represents the first angle average value, $N_{aR}$ represents the number of the antennas via which the user equipment transmits the preamble signals, and $\theta_s^{(j)}$ represents the first angle value of the preamble signal transmitted via the $j^{th}$ antenna.

S407: determine the uplink synchronization timing deviation.

Specifically, the base station determines the uplink synchronization timing deviation based on the first angle average value, where the uplink synchronization timing deviation meets the formula of:

$$TA = \frac{\overline{\theta_s} N_{FFT}}{2\pi};$$

wherein TA represents the uplink synchronization timing deviation; and $N_{FFT}$ is the number of the points of the FFT for the preamble signal.

Second scenario: the base station performs the conjugate multiplication on the channel estimate value corresponding to each symbol group based on the frequency hopping pattern as shown in FIG. 2 to obtain the first radian value, which is implemented in the first way, and M is equal to 6.

Figure 5:
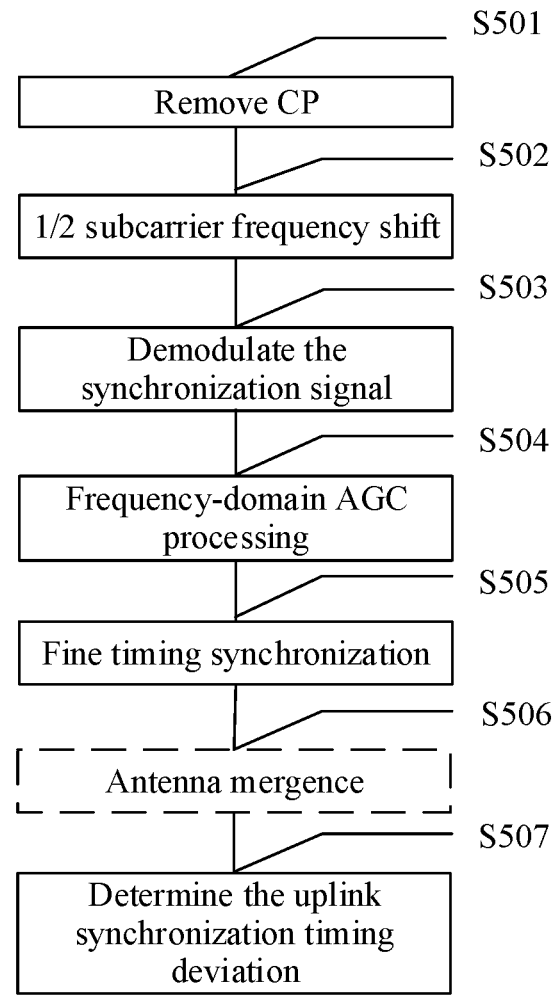
FIG. 5 is a flow chart of a method of determining uplink synchronization timing deviation in accordance with an embodiment of the disclosure.

As shown in FIG. 5, the process in which the base station determines the uplink synchronization timing deviation specifically includes the following steps.

S501: remove CP.
S502: ½ subcarrier frequency shift.
S503: demodulate the synchronization signal.
S504: frequency-domain AGC processing.
S501-S504 refer to the steps S401-S404 as shown in FIG. 4, and the repeated description thereof will be omitted.
S505: fine timing synchronization.

Specifically, the base station determines the average value of the frequency-domain data corresponding to five OFDM symbols after the frequency-domain AGC processing in each symbol group as the channel estimate value of the frequency-domain channel occupied by each symbol group, performs the conjugate multiplication on the channel estimate values of the symbol group 1 and symbol group 4 of which the frequency hopping interval is six subcarriers in the preamble signal, performs the conjugate multiplication on the channel estimate values of the symbol group 2 and the symbol group 3 of which the frequency hopping interval is six subcarriers, and obtains a sum of the two conjugate multiplication results to obtain the second radian value, wherein the second radian value meets the formula of:

$$R_1 = y_1^* y_4 e^{j\phi} + y_3 y_2^* e^{j3\phi};$$

$R_1$ represents the second radian value, $y_1$ represents the channel estimate value of the symbol group 1, $y_2$ represents the channel estimate value of the symbol group 2, $y_3$ represents the channel estimate value of the symbol group 3, and $y_4$ represents the channel estimate value of the symbol group 4, $\phi$ meets the formula of:

$$\phi = 2\pi \Delta f T;$$

wherein $\Delta f$ represents the residual frequency offset value of the user equipment and T represents the time length of transmitting one symbol group.

In a possible implementation, when receiving several preamble signals transmitted repeatedly by the user equipment, the fine timing synchronization process performed by the base station can be implemented in the following ways.

C1. For each preamble signal, the base station determines the second radian value corresponding to each preamble signal.

When the user equipment transmits the preamble signals repeatedly based on different frequency hopping patterns, each preamble signal may frequency hops from the symbol group 2 to the symbol group 3 by the positive hopping (that is, the center frequency of the frequency-domain channel occupied by the symbol group 2 is less than that occupied by the symbol group 3) or by the negative hopping (that is, the center frequency of the frequency-domain channel occupied by the symbol group 2 is greater than that occupied by the symbol group 3). In order to ensure the phase consistency, the second radian values of several preamble signals are corrected in the embodiment of the disclosure.

Specifically, for several preamble signals, the base station corrects the second radian value of the preamble signal which frequency hops from the symbol group 2 to the symbol group 3 by the positive hopping, where the corrected second radian value meets the formula of:

$$R_1 = (y_1^* y_4 e^{j\phi} + y_3 y_2^* e^{j3\phi})^*.$$

Or, for several preamble signals, the base station can also correct the second radian value of the preamble signal which frequency hops from the symbol group 2 to the symbol group 3 by the negative hopping, which is not limited herein.

C2. The base station determines the radian average value of the second radian values of the several preamble signals, where the radian average value meets the formula of:

$$\overline{R_1} = \frac{1}{N_{rep}} \sum_{i=1}^{N_{rep}} R_1^{(i)};$$

wherein $\overline{R_1}$ represents the radian average value, $N_{rep}$ number of repeated transmitting by the user equipment, and $R_1^{(i)}$ represents the second radian value of the $i^{th}$ preamble signal transmitted.

C3. The base station converts the radian average value into the second angle value which meets the formula of:

$$\theta_I = \text{angle}(\overline{R_1});$$

wherein $\theta_I$ represents the second angle value.

Optionally, the step S506 is performed after S505 and before S507.

S506: antenna mergence.

Specifically, when receiving several preamble signals transmitted by the user equipment via multi-antenna, the base station determines, for each preamble signal, the second angle value corresponding to each preamble signal, and then determines the second angle average value of the second angle values of the several preamble signals, where the second angle average value meets the formula of:

$$\overline{\theta_I} = \frac{1}{N_{aR}} \sum_{j=1}^{N_{aR}} \theta_I^{(j)};$$

wherein $\overline{\theta_1}$ represents the second angle average value, $N_{aR}$ represents the number of the antennas via which the user equipment transmits the preamble signals, and $\theta_1^{(j)}$ represents the second angle value of the preamble signal transmitted via the $j^{th}$ antenna.

S507: determine the uplink synchronization timing deviation.

Specifically, the base station determines the uplink synchronization timing deviation based on the second angle average value, where the uplink synchronization timing deviation meets the formula of:

$$TA = \frac{\overline{\theta_1} N_{FFT}}{2\pi 6};$$

wherein TA represents the uplink synchronization timing deviation; and $N_{FFT}$ is the number of the points of the FFT for the preamble signal.

Third scenario: the base station performs the conjugate multiplication on the channel estimate value corresponding to each symbol group based on the frequency hopping pattern as shown in FIG. 2 to obtain the first radian value, which is implemented in the second way, and N is equal to 6 and H is equal to 6.

Figure 6:
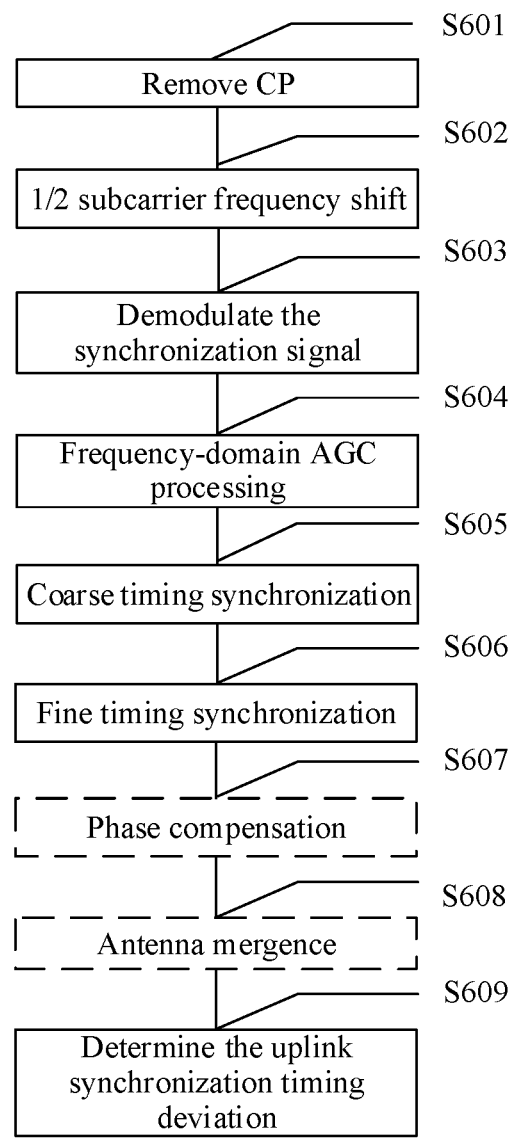
FIG. 6 is a flow chart of a method of determining uplink synchronization timing deviation in accordance with an embodiment of the disclosure.

As shown in FIG. 6, the process in which the base station determines the uplink synchronization timing deviation specifically includes the following steps.

S601: remove CP.

S602: ½ subcarrier frequency shift.

S603: demodulate the synchronization signal.

S604: frequency-domain AGC processing.

S601-S604 refer to the steps S401-S404 as shown in FIG. 4, and the repeated description thereof will be omitted here.

S605: coarse timing synchronization.

Specifically, the base station determines the channel estimate value of the frequency-domain channel occupied by transmitting each symbol group in the preamble signal, and determines the first angle value $\theta_s$ based on the frequency hopping pattern as shown in FIG. 2.

Specifically how to determine the first angle value $\theta_s$ based on the frequency hopping pattern as shown in FIG. 2 can refer to the step S405 as shown in FIG. 4, and the repeated description thereof will be omitted in the embodiment of the disclosure.

S606: fine timing synchronization.

Specifically, the base station determines the channel estimate value of the frequency-domain channel occupied by transmitting each symbol group in the preamble signal, and determines the second angle value $\theta_l$ based on the frequency hopping pattern as shown in FIG. 2.

Specifically how to determine the second angle value $\theta_l$ based on the frequency hopping pattern as shown in FIG. 2 can refer to the step S505 as shown in FIG. 5, and the repeated description thereof will be omitted in the embodiment of the disclosure.

Here, the sequential order of steps S605 and S606 is not defined strictly. S605 can be performed before S606, or S606 can be performed before S605, or S605 and S606 are performed at the same time, which is not limited specifically in the embodiments of the disclosure.

Optionally, S607 is performed after S606 and before S609.

S607: phase compensation.

Specifically, the base station performs the phase compensation on the second angle value $\theta_l$ based on the first angle value $\theta_s$, where $\theta_l$ after the phase compensation meets the formula of:

$$\theta_{l1} = \text{angle}(R_l e^{-j6\theta_s});$$

wherein $\theta_{l1}$ represents $\theta_{l1}$ after the phase compensation; and $R_1$ represents the second radian value.

It is necessary to note that since the accuracy of the frequency offset estimation has the larger effect on determining the uplink timing synchronization deviation, the system performance after the frequency offset compensation gets worse due to the inaccurate frequency offset estimation in the case that the times of repetition is more and the signal to noise ratio is lower or the residual frequency offset is small. Thus when performing the phase compensation on the second angle value $\theta_l$, the base station mainly considers the following factors:

a) the number of times of repeatedly transmitting by the user equipment the preamble signals is less than the first threshold;

b) the residual frequency offset of the user equipment determined by the base station is less than the second threshold;

c) the uplink signal to noise ratio detected by the base station is lower than the third threshold.

When at least one condition described above is met, the base station does not perform the phase compensation on the second angle value $\theta_l$.

Optionally, the step S608 is performed after S607 and before S609.

S608: antenna mergence.

Specifically, when receiving several preamble signals transmitted by the user equipment via multi-antenna, the base station determines the first angle average value $\overline{\theta_s}$ and the second angle average value $\overline{\theta_1}$.

Specifically how to determine the first angle average value $\overline{\theta_s}$ can refer to the step S406 as shown in FIG. 4, and the repeated description thereof will be omitted in the embodiment of the disclosure.

Specifically how to determine the second angle average value $\overline{\theta_l}$ can refer to the step S506 as shown in FIG. 5, and the repeated description thereof will be omitted in the embodiment of the disclosure.

S609: determine the uplink synchronization timing deviation.

Specifically, the base station determines the uplink synchronization timing deviation based on the angle average values, where the uplink synchronization timing deviation meets the formula of:

$$TA = \frac{\overline{\theta_s} N_{FFT}}{2\pi} + \frac{\overline{\theta_1} N_{FFT}}{2\pi 6};$$

wherein TA represents the uplink synchronization timing deviation; and $N_{FFT}$ is the number of the points of the FFT for the preamble signal.

In the embodiments of the disclosure, the base station receives the preamble signal transmitted by the user equipment, then determines the channel estimate value of the frequency-domain channel occupied by each symbol group in the preamble signal, then performs the conjugate multiplication on the channel estimate value corresponding to each symbol group based on the frequency hopping pattern used by the preamble signal to obtain the first radian value, and determines the uplink synchronization timing deviation of the user equipment based on the first radian value. Since the phase difference of the preamble signal is caused by the uplink synchronization timing deviation, the phase difference can reflect the uplink synchronization timing deviation of the user equipment. Compared with the prior art in which the base station performs the transform processing such as FFT and IDFT on the preamble sequence, in the embodiment of the disclosure, the first radian value is obtained by performing the conjugate multiplication on the channel estimate value corresponding to each symbol group in the preamble signal and the phase difference of the preamble signal is determined according to the first radian value, to increase the accuracy in determining the uplink synchronization timing deviation.

Figure 7:
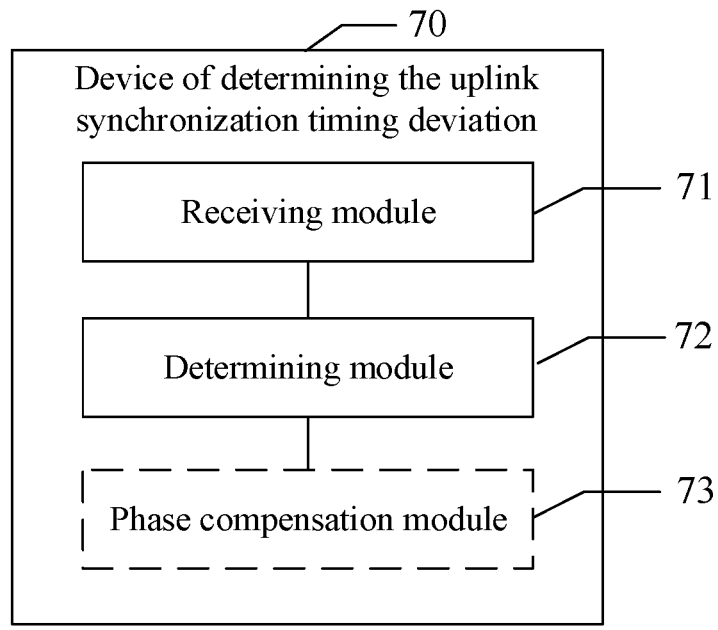
FIG. 7 is a schematic structural diagram of a device of determining uplink synchronization timing deviation in accordance with an embodiment of the disclosure.

Based upon the same inventive concept as the method embodiment corresponding to FIG. 3, an embodiment of the disclosure provides a device 70 of determining the uplink synchronization timing deviation, and the device can be applied to the base station equipment. As shown in FIG. 7, the device 70 includes a receiving module 71 and a determining module 72, wherein:

the receiving module 71 is configured to receive a preamble signal transmitted by a user equipment;

the determining module 72 is configured to determine the channel estimate value of the frequency-domain channel occupied by each symbol group in the preamble signal received by the receiving module 71, perform the conjugate multiplication on the channel estimate value corresponding to each symbol group based on the frequency hopping pattern used by the preamble signal to obtain the first radian value, and determine the uplink synchronization timing deviation of the user equipment based on the first radian value.

In a possible implementation, when performing the conjugate multiplication on the channel estimate value corresponding to each symbol group based on the frequency hopping pattern used by the preamble signal to obtain the first radian value, the determining module 72 is configured to:

perform the conjugate multiplication on the channel estimate values of any two symbol groups of which the frequency hopping interval is M subcarriers in the preamble signal to obtain at least two results, and obtain a sum of the at least two results of the conjugate multiplication as the first radian value, wherein M is a positive integer.

In another possible implementations, when performing the conjugate multiplication on the channel estimate value corresponding to each symbol group based on the frequency hopping pattern used by the preamble signal to obtain the first radian value, the determining module 72 is configured to:

D1. perform the conjugate multiplication on the channel estimate values of any two symbol groups of which the frequency hopping interval is N subcarriers in the preamble signal to obtain at least two results, and obtain a sum of the at least two results of the conjugate multiplication as the second radian value, wherein N is a positive integer;

D2. perform the conjugate multiplication on the channel estimate values of any two symbol groups of which the frequency hopping interval is H subcarriers in the preamble signal to obtain at least two results, and obtain a sum of the at least two results of the conjugate multiplication as the third radian value, wherein H is a positive integer and N is less than H;

D3. obtain a sum of the second radian value and the third radian value as the first radian value.

Optionally, the uplink synchronization timing deviation meets the formula of:

$$TA = \frac{\theta_{s1} N_{FFT}}{2\pi N} + \frac{\theta_{l1} N_{FFT}}{2\pi H};$$

wherein TA represents the uplink synchronization timing deviation; $\theta_{s1}$ represents the angle value obtained by converting the second radian value; $\theta_{l1}$ represents the angle value obtained by converting the third radian value; and $N_{FFT}$ is the number of points of the FFT for the preamble signal.

Optionally, the device further includes a phase compensation module 73 configured, before the determining module 72 determines the uplink synchronization timing deviation of the user equipment based on the first radian value, to perform the phase compensation on an angle value obtained by converting the third radian value determined by the determining module 72, wherein the angle value obtained by converting the third radian value after the phase compensation meets the formula of:

$$\theta_{l2} = \text{angle}(R_l e^{-j6\theta_{s2}});$$

wherein $\theta_{l2}$ represents the angle value obtained by converting the third radian value after the phase compensation; $R_l$ represents the third radian value; and $\theta_{s2}$ represents the angle value obtained by converting the second radian value.

Optionally, the receiving module 71 is configured to: receive preamble signals transmitted repeatedly by the user equipment;

the determining module 72 is further configured to: determine the first average value of the first radian values of the preamble signals transmitted repeatedly, and determine the uplink synchronization timing deviation of the user equipment based on the first average value after performing the conjugate multiplication on the channel estimate value corresponding to each symbol group based on the frequency hopping pattern used by the preamble signal to obtain the first radian value.

Optionally, the receiving module 71 is configured to: receive the preamble signals transmitted by the user equipment via the multi-antenna;

the determining module 72 is further configured to: determine the second average value of the first radian values of the preamble signals sent via the multi-antenna, and determine the uplink synchronization timing deviation of the user equipment based on the second average value after performing the conjugate multiplication on the channel estimate value corresponding to each symbol group based on the frequency hopping pattern used by the preamble signal to obtain the first radian value.

In the embodiments of the disclosure, the base station receives the preamble signal transmitted by the user equipment, then determines the channel estimate value of the frequency-domain channel occupied by each symbol group in the preamble signal, then performs the conjugate multiplication on the channel estimate value corresponding to each symbol group based on the frequency hopping pattern used by the preamble signal to obtain the first radian value, and determines the uplink synchronization timing deviation of the user equipment based on the first radian value. Since the phase difference of the preamble signal is caused by the uplink synchronization timing deviation, the phase difference can reflect the uplink synchronization timing deviation of the user equipment. Compared with the prior art in which the base station performs the transform processing such as FFT and IDFT on the preamble sequence, in the embodiment of the disclosure, the first radian value is obtained by performing the conjugate multiplication on the channel estimate value corresponding to each symbol group in the preamble signal and the phase difference of the preamble signal is determined according to the first radian value, to increase the accuracy in determining the uplink synchronization timing deviation.

Figure 8:
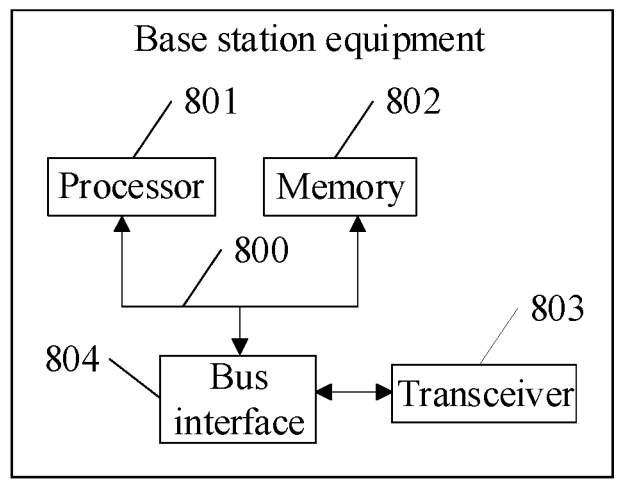
FIG. 8 is a schematic structural diagram of a base station equipment in accordance with an embodiment of the disclosure.

Based upon the same inventive concept as the method embodiment corresponding to FIG. 3, an embodiment of the disclosure provides a base station equipment. As shown in FIG. 8, the base station equipment includes a processor 801, a memory 802 and a transceiver 803, wherein:

the processor 801 is configured to read the program in the memory 802 and perform the process of:

receiving and transmitting the information via the transceiver 803 and performing the method described in the above embodiment corresponding to FIG. 3;

the transceiver 803 is configured to receive and transmit the information under the control of the processor 801;

the memory 802 is configured to store the software program.

In FIG. 8, the bus architecture is represented by the bus 800, the bus 800 can include any numbers of interconnected buses and bridges, and the bus 800 may link various circuits of one or more processors represented by the processor 801 and the memory represented by the memory 802. The bus 800 can further link various other circuits such as peripheral device, voltage regulator and power management circuit, which are all well known in the art and thus will not be further described again herein. The bus interface 804 provides an interface between the bus 800 and the transceiver 803. The transceiver 803 can be one element or can be a plurality of elements, i.e., a plurality of receiver and transmitter, and provide the units for communicating with various other devices over the transmission media.

The processor 801 is responsible for managing the bus 800 and general processing, and can further provide various functions including timing, peripheral interface, voltage regulation, power management and other control functions. But the memory 802 can be used to store the data used when the processor 801 performs the operations.

Optionally, the processor 801 can be Central Processing Unit (CPU), Application Specific Integrated Circuit (ASIC), Field-Programmable Gate Array (FPGA) or Complex Programmable Logic Device (CPLD), Digital Signal Processor (DSP) or the like.

It should be understood by those skilled in the art that the embodiments of the disclosure can provide methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the embodiments of the disclosure have been described, those skilled in the art can make additional alterations and modifications to these embodiments once they learn about the basic creative concepts. Thus the attached claims are intended to be interpreted to include the embodiments as well as all the alterations and modifications falling within the scope of the disclosure.

Evidently those skilled in the art can make various modifications and variations to the disclosure without departing from the spirit and scope of the disclosure. Thus the disclosure is also intended to encompass these modifications and variations therein as long as these modifications and variations come into the scope of the claims of the disclosure and their equivalents.

What is claimed is:

1. A method of determining uplink synchronization timing deviation, comprising:

receiving, by a base station, a preamble signal transmitted by a user equipment;

determining, by the base station, a channel estimate value of a frequency-domain channel occupied by each symbol group in the preamble signal;

performing, by the base station, conjugate multiplication on the channel estimate value corresponding to each symbol group based on a frequency hopping pattern used by the preamble signal to obtain a first radian value, and determining the uplink synchronization timing deviation of the user equipment based on the first radian value;

wherein performing, by the base station, conjugate multiplication on the channel estimate value corresponding to each symbol group based on a frequency hopping pattern used by the preamble signal to obtain a first radian value, comprises:

performing, by the base station, conjugate multiplication on channel estimate values of any two symbol groups of which a frequency hopping interval is N subcarriers in the preamble signal to obtain at least two results, and obtaining a sum of the at least two results of the conjugate multiplication as a second radian value, wherein N is a positive integer;

performing, by the base station, conjugate multiplication on channel estimate values of any two symbol groups of which a frequency hopping interval is H subcarriers in the preamble signal to obtain at least two results, and obtaining a sum of the at least two results of the conjugate multiplication as a third radian value, wherein H is a positive integer and N is less than H;

obtaining, by the base station, a sum of the second radian value and the third radian value as the first radian value.

2. The method of claim 1, wherein the uplink synchronization timing deviation meets a formula of:

$$TA = \frac{\theta_{s1} N_{FFT}}{2\pi N} + \frac{\theta_{l1} N_{FFT}}{2\pi H};$$

wherein TA represents the uplink synchronization timing deviation; $\theta_{s1}$ represents an angle value obtained by converting the second radian value; $\theta_{l1}$ represents an angle value obtained by converting the third radian value; and $N_{FFT}$ is the number of points of Fast Fourier Transform, FFT, for the preamble signal, wherein $\pi$ is the constant $\pi$.

3. The method of claim 1, wherein before the base station determines the uplink synchronization timing deviation of the user equipment based on the first radian value, the method further comprises:

performing, by the base station, phase compensation on an angle value obtained by converting the third radian value, wherein the angle value obtained by converting the third radian value after the phase compensation meets a formula of:

$$\theta_{l2} = \text{angle}(R_l \times e^{-j6\theta_{s2}});$$

wherein $\theta_{l2}$ represents the angle value obtained by converting the third radian value after the phase compensation; $R_l$ represents the third radian value; and $\theta_{s2}$ represents an angle value obtained by converting the second radian value, wherein e is the constant e.

4. The method of claim 1, wherein receiving, by the base station, the preamble signal transmitted by the user equipment, comprises:

receiving, by the base station, preamble signals transmitted repeatedly by the user equipment;

after performing, by the base station, conjugate multiplication on the channel estimate value corresponding to each symbol group based on a frequency hopping pattern used by the preamble signal to obtain the first radian value, the method further comprises:

determining, by the base station, a first average value of first radian values of the preamble signals transmitted repeatedly, and determining the uplink synchronization timing deviation of the user equipment based on the first average value.

5. The method of claim 1, wherein receiving, by the base station, the preamble signal transmitted by the user equipment, comprises:

receiving, by the base station, the preamble signals transmitted by the user equipment via multi-antenna;

after performing, by the base station, conjugate multiplication on the channel estimate value corresponding to each symbol group based on the frequency hopping pattern used by the preamble signal to obtain the first radian value, the method further comprises:

determining, by the base station, a second average value of the first radian values of the preamble signals transmitted via the multi-antenna, and determining the uplink synchronization timing deviation of the user equipment based on the second average value.

6. A device of determining uplink synchronization timing deviation, comprising:

a transceiver configured to receive a preamble signal transmitted by a user equipment;

a processor configured to determine a channel estimate value of a frequency-domain channel occupied by each symbol group in the preamble signal received by the transceiver, perform conjugate multiplication on the channel estimate value corresponding to each symbol group based on a frequency hopping pattern used by the preamble signal to obtain a first radian value, and determine the uplink synchronization timing deviation of the user equipment based on the first radian value;

wherein when performing conjugate multiplication on the channel estimate value corresponding to each symbol group based on a frequency hopping pattern used by the preamble signal to obtain a first radian value, the processor is configured to:

perform conjugate multiplication on channel estimate values of any two symbol groups of which a frequency hopping interval is N subcarriers in the preamble signal to obtain at least two results, and obtain a sum of the at least two results of the conjugate multiplication as a second radian value, wherein N is a positive integer;

perform conjugate multiplication on channel estimate values of any two symbol groups of which a frequency hopping interval is H subcarriers in the preamble signal to obtain at least two results, and obtain a sum of the at least two results of the conjugate multiplication as a third radian value, wherein H is a positive integer and N is less than H;

obtain a sum of the second radian value and the third radian value as the first radian value.

7. The device of claim 6, wherein the uplink synchronization timing deviation meets a formula of:

$$TA = \frac{\theta_{s1} N_{FFT}}{2\pi N} + \frac{\theta_{l1} N_{FFT}}{2\pi H};$$

wherein TA represents the uplink synchronization timing deviation; $\theta_{s1}$ represents an angle value obtained by converting the second radian value; $\theta_{l1}$ represents an angle value obtained by converting the third radian value; and $N_{FFT}$ is the number of points of Fast Fourier Transform, FFT, for the preamble signal, wherein $\pi$ is the constant $\pi$.

8. The device of claim 6, wherein the processor is further configured to perform phase compensation on an angle value obtained by converting the third radian value determined before determining the uplink synchronization timing deviation of the user equipment based on the first radian value, wherein the angle value obtained by converting the third radian value after the phase compensation meets a formula of:

$$\theta_{l2} = \text{angle}(R_l \times e^{-j6\theta_{s2}});$$

wherein $\theta_{l2}$ represents the angle value obtained by converting the third radian value after the phase compensation; $R_l$ represents the third radian value; and $\theta_{s2}$ represents an angle value obtained by converting the second radian value, wherein e is the constant e.

9. The device of claim 6, wherein the transceiver is configured to:

receive preamble signals transmitted repeatedly by the user equipment;

the processor is further configured to:

after performing conjugate multiplication on the channel estimate value corresponding to each symbol group based on the frequency hopping pattern used by the preamble signal to obtain the first radian value, determine a first average value of the first radian values of the preamble signals transmitted repeatedly, and determine the uplink synchronization timing deviation of the user equipment based on the first average value.

10. The device of claim 6, wherein the transceiver is configured to:

receive the preamble signals transmitted by the user equipment via multi-antenna;

the processor is further configured to:

after performing conjugate multiplication on the channel estimate value corresponding to each symbol group based on the frequency hopping pattern used by the preamble signal to obtain the first radian value, determine a second average value of the first radian values of the preamble signals transmitted via the multi-antenna, and determine the uplink synchronization timing deviation of the user equipment based on the second average value.

* * * * *